Sept. 27, 1938.  G. W. ALDEEN ET AL  2,131,261
LINK CHAIN
Filed April 5, 1937
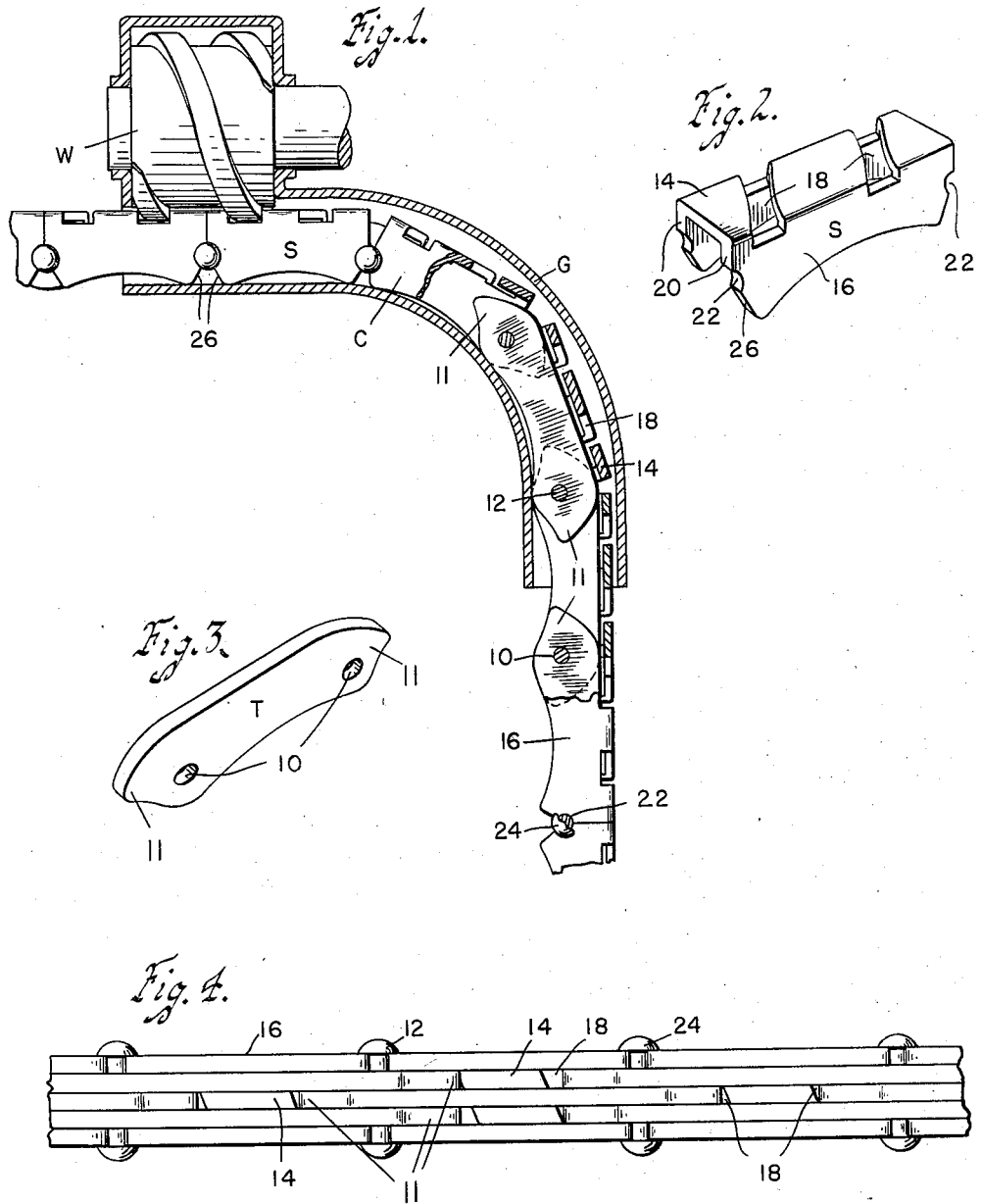

Patented Sept. 27, 1938

2,131,261

UNITED STATES PATENT OFFICE 2,131,261

LINK CHAIN

Gedor W. Aldeen, Rockford, Ill., and Sern Madsen, Clinton, Iowa, assignors, by mesne assignments, to Curtis Companies Incorporated, Clinton, Iowa, a corporation of Iowa Application April 5, 1937, Serial No. 135,124

12 Claims. (Cl. 254—95)

An object of our invention is to provide a link chain of simple, durable and inexpensive construction.

A further object is to provide a link chain which comprises a continuous row of single and double tension links, each of which is partially enclosed by an outer or straddle link, the straddle link having gashes cut therein for coaction with worm threads or other operating mechanism for imparting longitudinal movement to the chain.

A further object is to provide pivot pins for the tension elements of the chain links and to provide the straddle elements with pin bearing notches engaging the peripheries of the pivot pins, thus providing thrusting relationship between the straddle elements and to also retain them on the tension elements.

Still a further object is to provide straddle elements with semi-circular notches so engaging pivot pins that limited pivotal movement of one straddle element relative to the next is permitted, yet the pivot pins so coact with the notches that the straddle elements are retained in position on the tension elements.

A further object is to provide a link chain which presents a smooth surface along its sides with only the headed ends of the pivot pins extending therefrom, this being accomplished by providing the outer elements of the links arranged in thrust relationship as distinguished from overlapping relationship for thrust and tension as in most link chains.

With these and other objects in view, our invention consists in the construction, arrangement and combination of the various parts of our link chain, whereby the objects contemplated are attained, as hereinafter more fully set forth, pointed out in our claims, and illustrated in the accompanying drawing, in which:

Figure 1 is a side elevation of a link chain embodying our invention and showing it passing through a curved guide means and an operator in the form of a worm coacting therewith for imparting movement to the chain with relation to the curved guide means.

Figure 2 is a perspective view of one of the straddle or thrust elements of the link chain.

Figure 3 is a perspective view of one of the tension elements of the link chain; and Figure 4 is a bottom plan view of the chain showing the association between the tension and thrust elements and their assembled relationship to each other.

On the accompanying drawing, we have used the reference character G to indicate generally a guide, C the link chain embodying our invention, and W a worm for operating the chain.

The chain C comprises a series of straddle or thrust elements S and a series of tension elements T. The tension elements T have perforations 10 to receive pivot pins 12. The straddle or thrust elements S are channel shaped as best shown in Figure 2, having webs 14 and flanges 16.

Gashes 18 are cut in the webs 14 for coaction with the tooth of the worm W, as shown in Figure 1, or with any other suitable type of operating device for imparting longitdinal movement to the chain C.

The ends 20 of the straddle elements S are adapted for thrusting engagement with each other, while the flanges 16 are provided with pin bearing notches 22 adapted to engage the peripheries of the pivot pins 12.

The tension elements T are successively arranged single and double, as shown in Figure 4, and are positioned between the flanges 16 of the straddle elements S. After the pivot pins 12 are inserted through the perforations 10 and through the notches 22, they are riveted or their ends headed as indicated at 24. The links of the chain are thus held in assembled position with the tension elements partially enclosed by the straddle elements.

The ends of the tension elements T are elongated as indicated at 11 on the drawing. This elongation is greater than half the width of the link.

Tension links of similar chains are usually rounded at their ends on a radius, the center of which is the axis of the pivot pin. The links T it will be noted, however, are elongated at 11 a distance greater than such radius, and this is done for the sole purpose of gaining more overlapping of the tension links, and hence greater inherent resistance of the chain when the links thereof are assembled in multiple against lateral or sidewise bending of the chain. This effectively increases the rigidity of the chain and eliminates the necessity of having to arrange the straddle elements S with overlapping portions for this purpose.

The ends of the straddle elements are cut back at an angle below the pin bearing notches 22, as indicated at 26. This permits deflection of the chain C in one direction, its deflection in the opposite direction being prevented or limited to a straight line movement by the ends 20 of the straddle elements. This permits bending of the chain as it passes through the guide G and straight line movement of the chain after such passage.

A chain of this character is adaptable for many uses, one use being shown in the Madsen Patent Number 2,017,543, issued October 15, 1935, wherein a chain is disclosed as an opening and closing device for hinged sashes or casement windows, such chain however lacking the improved features of our present chain.

Tension on the chain is effectively taken care of by the pivot connection of the tension elements T with each other, while thrust is effectively taken care of by the end-to-end relationship of the straddle elements S. All of this is accomplished without having to overlap one end of one straddle element relative to the adjacent end of the next straddle element, thus presenting smooth side surfaces for the chain, with the exception, of course, of the slight projections caused by the heads 24 on the pivot pins 12. The pivot pins so coact with the notches 22 that the straddle elements after being assembled cannot be dislocated relative to the tension elements, yet, due to the angularity of the shoulders 26, the chain may readily flex in one direction.

Some changes may be made in the construction and arrangement of the parts of our link chain without departing from the real spirit and purpose of our invention, and it is our intention to cover by our claims, any modified forms of structure or use of mechanical equivalents which may be reasonably included within their scope.

We claim as our invention:

1. In a link chain, a flexible chain-like element comprising a series of links, said links comprising straddle elements and tension elements, said tension elements having perforations and pivot pins through the perforations of the successive tension elements, said straddle elements having their ends in thrust relationship with said pivot pins interposed between them, said ends partially encircling said pivot pins to prevent displacement of said straddle elements from said tension elements.

2. In a link chain, a chain-like element comprising a series of links, said links comprising perforated tension elements and sheet metal blanks, each of said blanks being bent to form a central web and flanges on each side thereof, said web having a gash throughout its width, said tension links being positioned between the flanges of said blanks and pivot pins through the perforations of the successive tension elements.

3. In a link chain, a flexible chain-like element comprising a series of links, said links comprising straddle elements and tension elements, said tension elements having perforations, pivot pins through the perforations of the successive tension elements, said straddle elements being in thrust relationship with the peripheries of said pivot pins, the ends of said pins being headed over the outer surface of said straddle elements.

4. A link chain comprising a series of links, said links comprising straddle elements and tension elements, said tension elements having perforations, pivot pins extending therethrough, said straddle elements having their ends in thrust relationship with said pivot pins interposed between them and said straddle elements having operating notches outside the outline of said tension elements.

5. In a link chain structure, a flexible chain-like element comprising straddle elements and tension elements, said tension elements having perforations, pivot pins extending through the perforations of the successive tension elements, said straddle elements having their ends in thrust relationship with their pivot pins interposed between them, said ends partially encircling said pivot pins to prevent displacement of said straddle elements from said tension elements.

6. A link chain structure comprising a plurality of chain-like elements, each having channel shaped outer elements and tension elements therewithin, each of said channel shaped elements having a gash in its web for coaction with an operator and pivot pins extending through said tension elements, said channel shaped elements having pin bearing notches with successive notches engaging opposite sides of said pivot pins, said notches being less than a half circle to permit deflection of one channel shaped element relative to the next successive channel shaped element.

7. A link chain member comprising a plurality of links, each comprising tension links and channel shaped straddle links, said tension links being received between the flanges of said straddle links said straddle links having both their webs and their flanges abutting each other when the chain member is in straight position.

8. A link chain member comprising a plurality of spaced tension elements, another plurality of spaced tension elements spanning the distance between said first plurality of spaced tension elements, pivot pins extending through said tension elements and straddle links enclosing said tension elements and an adjacent pair of said straddle links having end contact only with opposite sides of the diameter of one of said pivot pins located between them.

9. A link chain member comprising a plurality of spaced tension elements, another plurality of spaced tension elements spanning the distance between said first plurality of spaced tension elements, pivot pins extending through said tension elements and straddle links enclosing said tension elements, said straddle links having pin bearing notches engaging the peripheries of said pivot pins.

10. A link chain member comprising a plurality of spaced tension elements, another plurality of spaced tension elements spanning the distance between said first plurality of spaced tension elements, pivot pins extending through said tension elements and straddle links enclosing said tension elements, said straddle links having pin bearing notches engaging the peripheries of said pivot pins, said notches being less than a half circle to permit deflection of said chain member.

11. In a link chain of the character disclosed, a plurality of successively arranged tension elements pivoted together, a plurality of channel shaped thrust elements partially enclosing said tension elements and means for retaining said channel shaped elements on said tension elements yet permit flexing of said link chain member.

12. In a link chain of the character disclosed, a plurality of successively arranged tension elements pivoted together, a plurality of channel shaped thrust elements partially enclosing said tension elements and means for retaining said channel shaped elements on said tension elements yet permit flexing of said link chain member, said means comprising notches formed in the ends of said channel shaped elements and partially encircling the pivot pins which connect said tension elements together.

GEDOR W. ALDEEN.
SERN MADSEN.